United States Patent

Meehan et al.

[11] Patent Number: 5,633,550
[45] Date of Patent: May 27, 1997

[54] GROUND DETECTOR BRUSH

[75] Inventors: Robert J. Meehan, Chuluota, Fla.; Theodore R. Barbour, Cogan Station, Pa.

[73] Assignee: Westinghouse Electric Corporation, Pittsburgh, Pa.

[21] Appl. No.: 376,985

[22] Filed: Jan. 23, 1995

[51] Int. Cl.$^6$ .............................. H02K 13/00; H02K 11/00
[52] U.S. Cl. ........................... 310/246; 310/249; 310/71
[58] Field of Search ................................ 310/71, 239, 240, 310/241, 242, 243, 244, 245, 246, 247, 248, 249

[56] References Cited

U.S. PATENT DOCUMENTS

| | | |
|---|---|---|
| 2,753,477 | 7/1956 | Yahn et al. .............................. 310/246 |
| 3,590,297 | 6/1971 | Smith ...................................... 310/239 |
| 3,816,783 | 6/1974 | Nakamura et al. ..................... 310/246 |
| 4,085,346 | 4/1978 | Yoshida .................................. 310/246 |
| 4,155,023 | 5/1979 | Hagenlocher et al. ................. 310/246 |
| 4,246,508 | 1/1981 | Zimmer ................................... 310/242 |
| 5,175,464 | 12/1992 | Smith ...................................... 310/239 |
| 5,227,950 | 7/1993 | Twerdochlib ........................... 361/221 |

Primary Examiner—Steven L. Stephan
Assistant Examiner—Michael Wallace, Jr.

[57] ABSTRACT

A ground detector brush which includes at least one metal leaf spring in addition to a metal conductor to which a brush is attached, where the metal conductor is not pre-bent to provide forces when in an active state to electrically engage a surface. The metal leaf spring serves the function of providing forces to electrically engage the brush against the surface and the metal conductor serves only the function of providing a ground or providing an electrical path to monitor a current level of a system.

14 Claims, 4 Drawing Sheets

GROUND DETECTOR BRUSH

FIELD OF THE INVENTION

The present invention relates to a ground detector brush, in particular, a ground detector brush which is part of a ground detector system of a turbine-generator.

BACKGROUND OF THE INVENTION

A ground detector brush may be used to electrically engage a surface so that current on the surface is transferred to the ground detector brush or to supply a ground where the brush is at ground potential. A ground detector brush usually consists of a brush soldered to a metal conductor. The brush of prior art ground detector brushes is used to electrically contact a surface and transfer any current on the surface to the metal conductor or supply a ground where the metal conductor is at ground potential. Thus, the metal conductor of prior art ground detector brushes is used to transfer current from the brush along its length to another current transferring device attached to the metal conductor or to supply a ground where the metal conductor is at ground potential. In addition, in the prior art, the metal conductor is used to provide forces to electrically engage the brush against the surface.

In order for the metal conductor to provide forces to electrically engage the brush against a surface, the metal conductor is normally pre-bent when formed so that when no outside forces are applied against the metal conductor (know as free state), the metal conductor will extent at an angle (in some embodiments, 7 degrees) past its centerline. As a consequence, when the metal conductor is bent back past its centerline during an active state (in some applications, 8.6 degrees past centerline for a total travel of 15.6 degrees (7+8.6), i.e., when pressed against a surface so that it extends 8.6 degrees beyond its centerline, the metal conductor will generate sufficient forces so that an electrical connection is formed between the brush and the surface.

In applications, the surface current may only be measured intermittently or a ground supplied only intermittently so that the brush does not excessively wear, necessitating frequent replacements. When the ground brush is in an inactive state of operation, i.e., when the surface current is not being measured or a ground is not being supplied, the metal conductor is withdrawn away from the surface, i.e., away from its active state position 8.6 degrees pass centerline and also away from its pre-bent or free state position. When in the inactive state, the metal spring extends at an angle (in one embodiment 10.3 degrees, for a total travel of 17.3 degrees from its pre-bent position) from its centerline and opposite in direction from the angle it extends when in its pre-bent or free state position. As a consequence, the angle between the pre-bent or free state position of the metal conductor and its inactive state position is equal to the sum of the two above mentioned angles (in one embodiment 17.3 degrees, i.e., 10.3+7.0 degrees).

As a consequence, the metal conductor is always under strain because when in its active state, it extends at a first angle (15.6 degrees in one embodiment) past its free, pre-bent, or non-straining position and when in its inactive state its extends at a larger angle (17.3 degrees in one embodiment) past its free state, pre-bent or non-straining position. As a consequence, the metal conductor may be subject to excessive metal fatigue so that the ground detector brush may fail to produce sufficient electrical contact with a surface after repeated use.

In practice, prior art ground detector brushes are have been used in ground detector systems within exciter systems of turbine-generators to determine whether the exciter systems is improperly increasing current level due to the presence of two grounds in the exciter system. The exciter system of a turbine-generator is used to provide a current to electromagnetic field windings of the generator. In particular, the exciter system is designed to keep the generator rotor of the exciter system at a specified excitation level.

In such systems, several ground detector brushes are used in the ground detector system. A first ground detector brush is used to supply a ground where the metal conductor is connected to a ground potential. The second ground detector brush is used to provide an electrical path to monitor the exciter system's current level. The metal conductor of this brush is insulated from the ground potential. Both metal conductors of the first and second ground detector brushes are connected to voltage regulator equipment.

The voltage regulator equipment is used to monitor the excitation current level. If the excitation current level increases, the increase indicates that a second ground exists in the rotating electrical system. The increased current flow may feed both grounds causing potential catastrophic electrical arcing and melting damage. The grounds may occur anywhere in the rotating electrical system, such as in the AC exciter, rectifier, and generator rotor. If the voltage regulator equipment detects the excitation current level has increased, the ground detector brushes are disengaged and the excitation current level is not permitted to be increased further. When the two ground detector brushes are disengaged from the exciter system, i.e., no longer electrically contacting the system, at least one ground is removed since one of the brushes is held at ground potential.

Thus, it is important that the ground brushes provide adequate force to engage the exciter system so that the one brush may supply a ground and the other brush may provide a path for the excitation current. The ground detector brushes of the prior art may fail over time to provide adequate contact due to the significant pre-bent required in the metal conductors of the ground detector brushes.

SUMMARY OF THE INVENTION

The present invention is a ground detector brush which has a metal conductor that is not pre-bent and thus is less likely to be subject to metal fatigue. In particular, the ground detector brush of the present invention includes a metal conductor, a brush attached to one side of the metal conductor and at least one leaf spring located on the other side of the metal conductor where the leaf spring is pre-bent to provide sufficient force to electrically contact a surface when the ground detector brush is in the active state of operation.

The present invention is also a ground detector brush suitable for replacing ground detector brushes having a metal conductor which provides force to electrically contact a surface. The ground detector includes a metal conductor having two sides, a brush attached to one side of the metal conductor, and at least one leaf spring located on the other side of the metal conductor.

The present invention is also an exciter system of a turbine-generator. The exciter system includes an exciter, generator rotor, a coupling operatively coupled to the exciter, and two ground detector brushes operatively coupled to the coupling. The ground detector brushes includes a metal conductor having two sides, a brush attached to one side of the metal conductor, and at least one leaf spring located on the other side of the metal conductor.

In a further embodiments of the present inventions, the ground detector brush may have at least three leaf springs.

In addition, the metal conductor may be made of copper and the leaf springs may be made of steel. The length of the leaf springs may also be offset so that the length of a leaf spring adjacent to the metal conductor is the longest and the length of each subsequent leaf spring adjacent to the metal conductor is smaller.

BRIEF DESCRIPTION OF THE DRAWINGS

FIG. 3b is a diagram of a front view of the ground detector brush assembly shown in FIG. 3a.

DETAILED DESCRIPTION OF THE PREFERRED EMBODIMENTS

Figure 1:
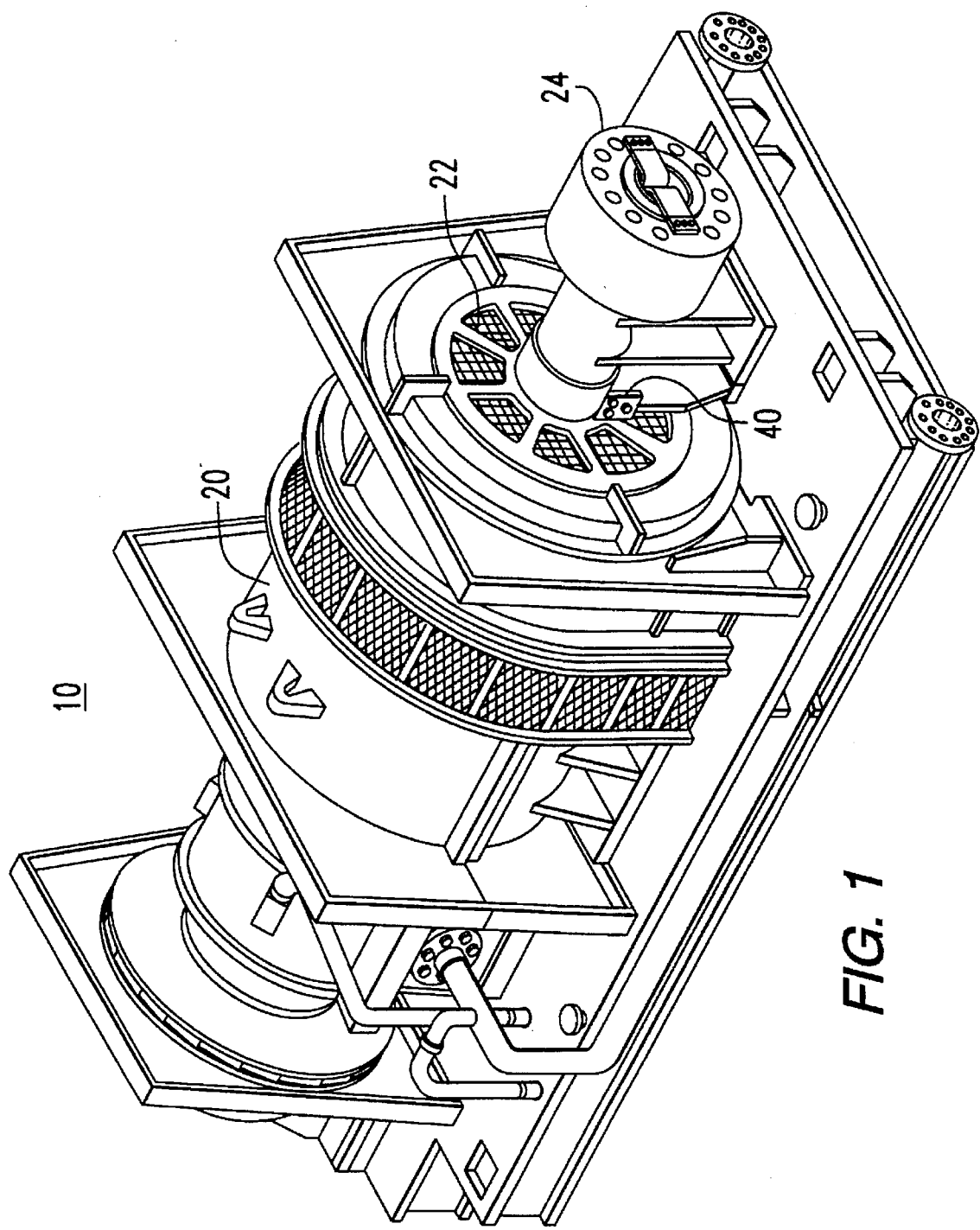
FIG. 1 is a diagram of an exemplary configuration of an exciter system of a turbine-generator system.

An exemplary configuration of an exciter system 10 of a turbine-generator system suitable for embodying a ground detector brush of this invention is shown in FIG. 1. The exciter system 10 as shown in FIG. 1 only illustrates the limited interaction of certain components of an exciter system as they relate to the present invention. A brief overview is presented by reference to this system 10. As shown in this figure, the exciter system 10 includes an exciter 20, diode wheel 22, coupling 24 and exemplary ground detector system 40 An exciter system would also include a generator rotor (not shown) attached to the coupling 24.

As noted above, the exciter systems of the turbine-generators are used to provide a current to electromagnetic field windings of the generator, i.e., to hold the generator rotor at a specified excitation level. As also noted above, ground detector systems, and in particular system 40, are used to determine whether there are two grounds in the exciter system by determining if the excitation current level is increasing. In one exemplary embodiment shown in FIG. 1, the ground detector system 40 is located between the diode wheel 22 and coupling 24. The ground detector system 40 allows two ground detector brushes to make contact with a ring (not shown) on the shaft of the rotor of the coupling 24 when in the active state. One ground detector brush is used to supply a ground and the other brush is used to an electrical path to monitor the exciter system's (or excitation) current level.

Figure 2:
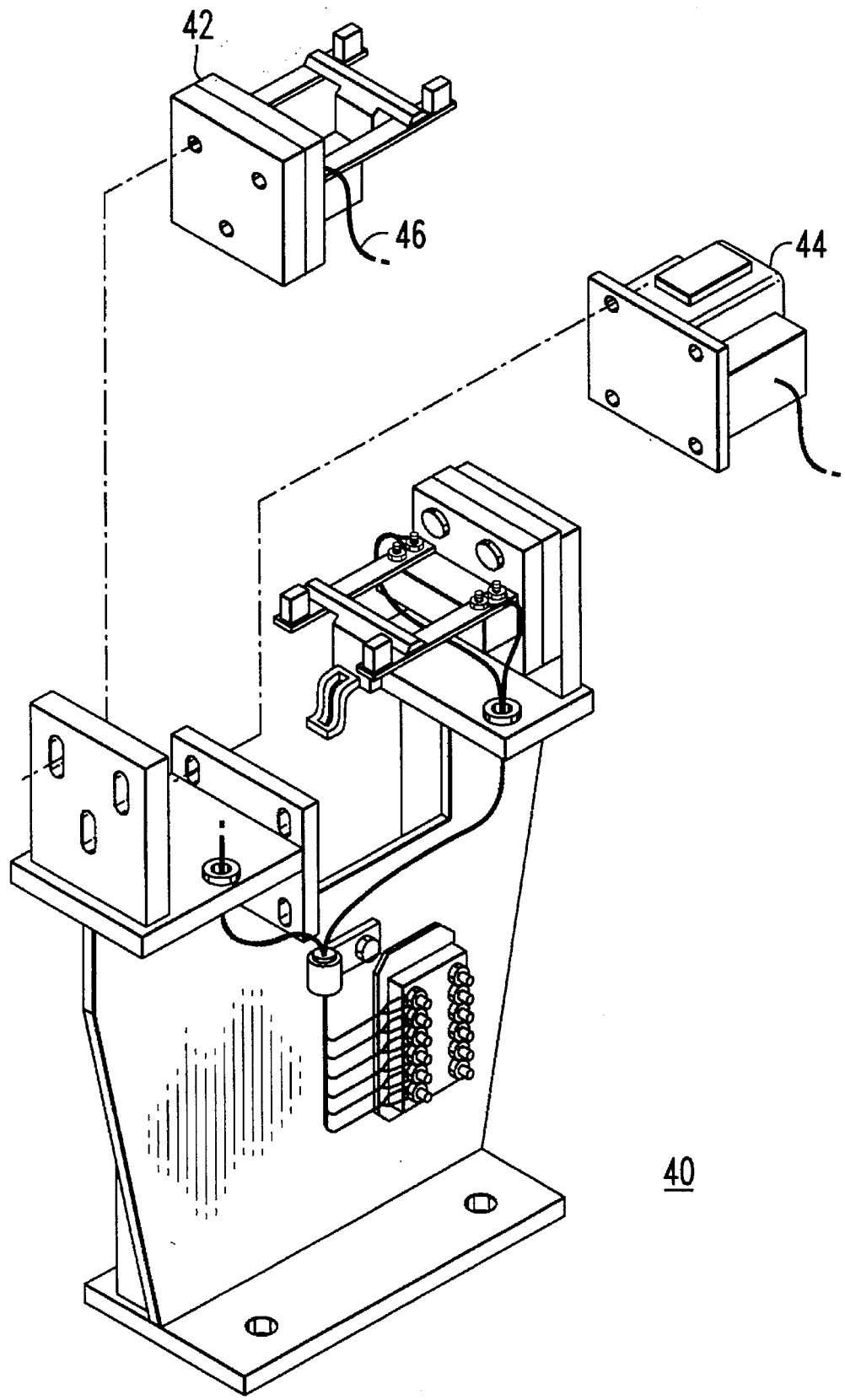
FIG. 2 is an expanded diagram of an exemplary configuration of a ground detector system suitable for use in the exciter system shown in FIG. 1.
Figure 5B:
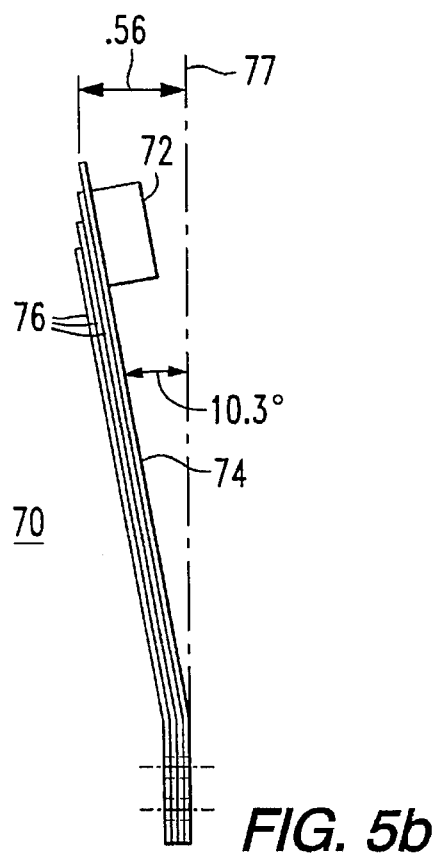
FIG. 5b is a diagram of the ground detector brush shown in FIG. 5a in an inactive state.
Figure 5A:
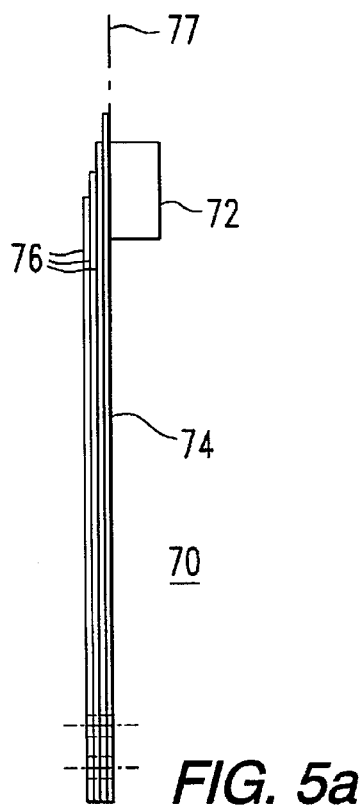
FIG. 5a is a diagram of an exemplary ground detector brush of the present invention at centerline, the free state of the metal conductor of the invention.

FIG. 2 illustrates an exemplary embodiment of a ground detector system 40 suitable for embodying a preferred embodiment of a ground detector brush of the invention (shown in FIGS. 5a and 5b). The exemplary ground detector system 40 includes a brush assembly 42, solenoid assembly 44, and current level detection wire 46 (to be electrically coupled to voltage regulator equipment (not shown)). The solenoid assembly 44 places the brush assembly 42 into either the active or the inactive state of operation. In the active state of operation or ground detection state, the solenoid assembly 44 dis-engages the brush assembly 42 which, in turn, allows the brush assembly 42 to electrically contact (not shown) the exciter system 10 along the shaft of the rotor of the coupling 24. When in this state of operation, one of the two brushes of the brush assembly 42 conducts any current along the shaft of the rotor of the coupling 24 to the wire 46 where the wire 46 is coupled to the brush assembly 42. The voltage regulator equipment (not shown) is electrically coupled to the wire 46 and measures the current conducted by the wire 46 to determine whether the exciter system 10 is increasing the excitation current level which may indicate the presence of two grounds. The other brush of the brush assembly is used to provide a ground.

When the solenoid assembly 44 places the brush assembly 42 in the inactive state, it engages the brush assembly 42 to pull it away from the shaft of the rotor of the coupling 24 severing the electrical contact between the brush assembly 42 and the coupling 24. In the exemplary embodiment of the ground detector system 40, the brush assembly is primarily kept in the inactive state by the solenoid assembly 44 to reduce the wear of brushes of the brush assembly 42. As a consequence, the current on the ground wire 46 is only sampled during the intervals when the solenoid assembly 44 places the brush assembly 42 in the active state.

Figure 3A:
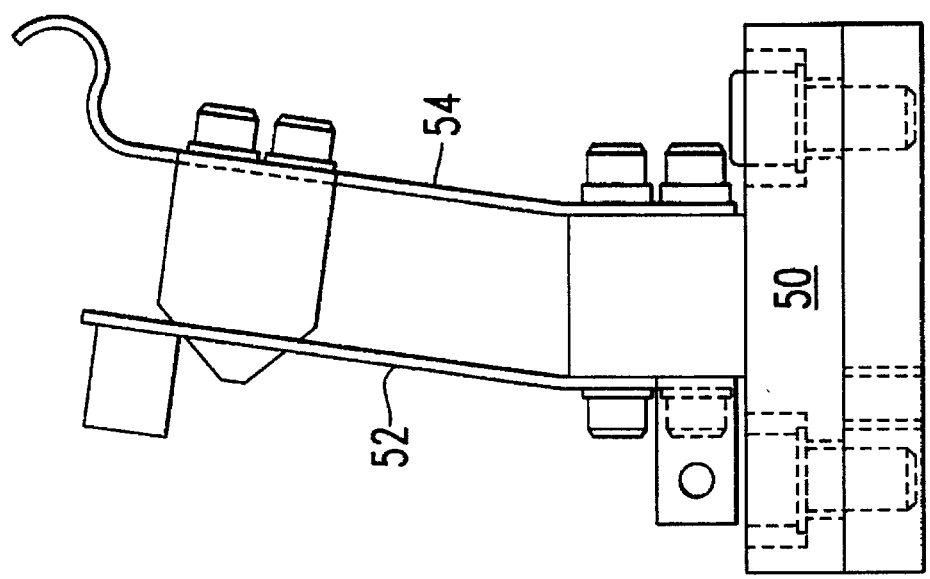
FIG. 3a is a diagram of a side view of an exemplary configuration of a ground detector brush assembly suitable for use in the exciter system shown in FIG. 1.
Figure 3B:
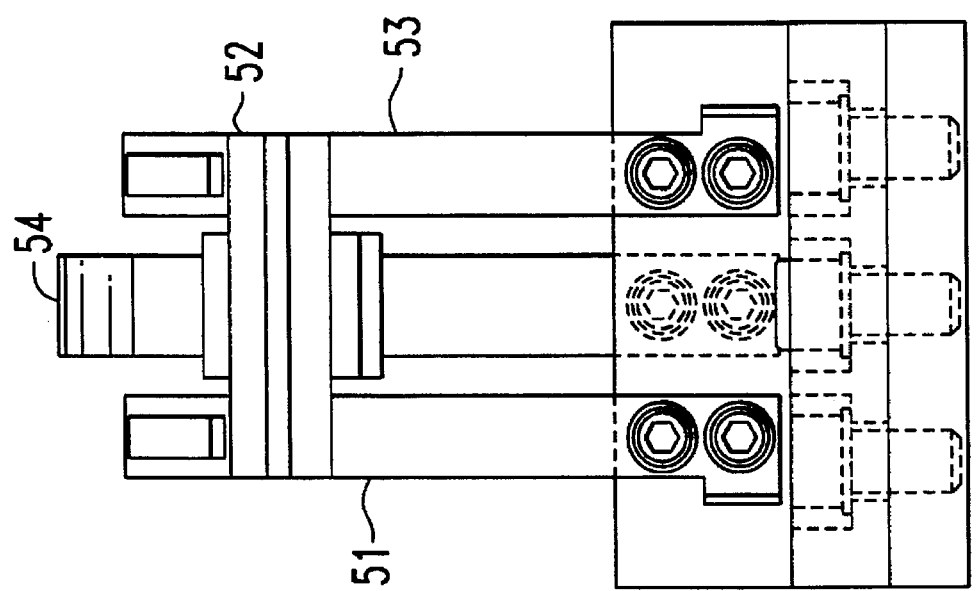

A portion of an exemplary ground detector system 50 also suitable for use in the exciter system 10 and with the preferred embodiment of a ground detector brush of the invention is shown in FIGS. 3a and 3b. This ground detector system 50 also includes a brush assembly 52 and a solenoid assembly 54 (of which only a portion is shown). The brush assembly 52 has two ground detector brushes 51 and 53 where one brush may be used to supply a ground and the other to provide an electrical path to monitor an exciter system's current level.

The brush assembly 52 in FIG. 3a is shown in the inactive state of operation, i.e., pulled back from its active position by the solenoid 54. When in the inactive state of operation, the brush assembly 52 is inclined at an angle away (in some embodiments, 10.3 degrees) from the front of the ground detector system 50, the front being seen at the bottom of FIG. 3b. When in its active state of operation, the brush assembly 52 engages the rotor and is, in one embodiment, inclined at an angle of approximately 8.6 degrees from the front of the ground detector system 50. The ground detector brush 70 of the present invention (as shown in FIGS. 5a and 5b) may be used in the brush assembly 52.

Figure 4:
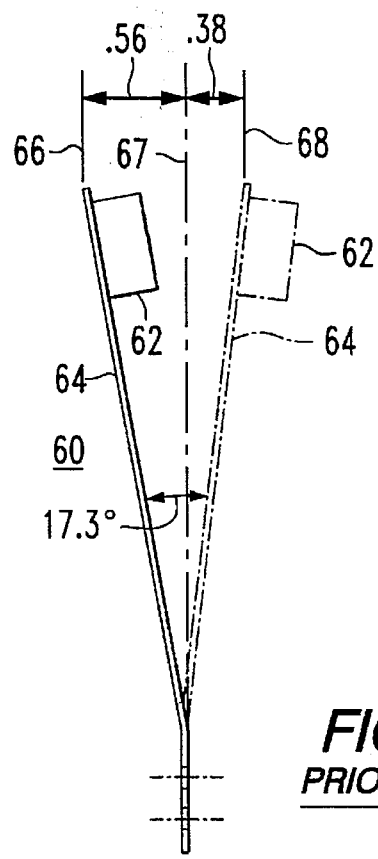
FIG. 4 is a diagram of a prior art ground detector brush in different states.

FIG. 4 is a diagram of a prior art ground detector brush 60 in different positions, where the brush 60 may be suitable for use in the brush assembly 52 shown in FIGS. 3a and 3b and the brush assembly 42 shown in FIG. 2. The ground detector brush 60 includes a metal conductor 64 having a brush 62 soldered onto it. As in other prior art ground detector brushes, in the ground detector brush 60, the metal conductor 64 serves two functions: 1) supplying a ground or providing an electrical path for the flow of current; and 2) providing forces to electrically engage the brush 62 against a surface (not shown).

In order for the metal conductor 64 to provide forces to electrically engage the brush against the shaft of the rotor of the coupling 24, the prior art metal conductor 64 is pre-bent. When the metal conductor 64 is in a free state or unassembled state (shown as 68 in FIG. 4), i.e., neither resting against the shaft in the active state or pulled away from the shaft during the inactive state, the metal conductor extends at an angle of 7 degrees past its centerline (shown as 67 in FIG. 4). Thus, when the metal conductor 64 is bent back past its centerline 67 during the active state, i.e., when pressed against the shaft, it generates force so that an electrical connection is formed between the brush 62 and the shaft of the rotor of the coupling 24.

In the exciter system 10, the brush engages the surface only intermittently so that the brush does not excessively wear, necessitating frequent replacements. During the inactive state of operation (shown as 66 in FIG. 4), the metal conductor 64 is withdrawn further away from the coupling 24, i.e., away from its active state position (not shown) past the centerline 67 and also away from its pre-bent or free state position 68. When in the inactive state 66, the metal spring 64 extends at an angle of 10.3 degrees in this embodiment from its centerline 67 and opposite in direction from the angle it extends when in its pre-bent or free state position 68. As a consequence, the angle between the pre-bent or free state position 68 of metal conductor 64 and its inactive state position 66 is equal to the sum of the two above mentioned angles, in particular 17.3 degrees, i.e., 10.3+7.0 degrees.

In one embodiment, the metal conductor 64 is bent at an angle of 8.6 degrees past its centerline 67 when in active state engaging the coupling 24. Thus, in the prior art metal conductor, during the active state, the conductor is extended 15.6 degrees (the sum of 8.6 degrees and 7.0 degrees) past its pre-bent state (past its tensile yield strength).

As a consequence, the metal conductor 64 is always under excessive strain because when in its active state, 8.6 degrees past centerline 67, it extends at 15.6 degrees past its free, pre-bent, or non-straining position 68 and when in its inactive state 66, its extends at a slightly larger angle, 7.3 degrees, past its free state, pre-bent or non-straining position 68. As a consequence, the metal conductor 64 may be subject to excessive metal fatigue so that the ground detector brush 60 may fail to produce sufficient electrical contact with the coupling 24 after extended periods of use.

FIGS. 5a and 5b are diagrams of a preferred embodiment of a ground detector brush 70 of the present invention suitable for use in brush assemblies including the brush assembly 42 shown in FIG. 2 and the brush assembly 52 shown in FIGS. 3a and 3b. The preferred embodiment of the ground detector brush 70 of the present invention includes a metal conductor 74 having a brush 72 soldered onto it and three leaf springs 76. In the ground detector brush 70 of the present invention, the metal conductor 74 serves only one function: supplying a ground or providing an electrical path to monitor an exciter system's current level. The leaf springs 76 serve the function of providing forces to electrically engage the brush against a surface to be electrically engaged by the brush 74 (this function, providing forces for engagement, is served by the prior art metal conductors).

As shown in FIGS. 5a and 5b, the metal leaf springs 76 are placed on a side of the metal conductor 74 opposite the brush 72. In the preferred embodiment of the invention, the length of the leaf springs 76 are offset so that the leaf spring closest to the metal conductor 74 is longest in length and each subsequent leaf spring 76 adjacent to the metal conductor is smaller in length. In addition, in the preferred embodiment of the invention, the metal leaf springs 76 are steel and the metal conductor 74 is copper. Copper was selected because of its good conduction properties whereas steel was selected because of its rigidity. Other metals or alloys may be selected in place of copper or steel that have similar properties and thus would serve the same function depending on the specific application of the ground detector brush 70 of the present invention.

In addition, depending on the application and the selection of the metals used for leaf springs, more or less than three leaf springs 76 may be used in the ground detector brush 70 of the present invention with the minimum number of leaf springs in a ground detector brush 70 of the present being one. Thus, depending on the application of the ground detector brush 70 and the selection of the metal of the leaf spring 76, in another preferred embodiment of the invention (not shown), the ground detector brush 70 may have only one metal leaf spring 76.

In practice, when the ground detector brush 70 of the present invention is used in a ground detector brush assembly of a ground detector system of an exciter, the ground detector brush may also, from time to time, be transferred from an inactive state, shown in FIG. 5b, to an active state (not shown). Since the metal conductor 74 is not used to provide force to electrically engage the brush against the shaft of the rotor of the coupling 24, the metal conductor 74 is not pre-bent. The free state of the metal conductor is shown in FIG. 5a, i.e., the centerline of the ground detector brush 70.

Thus, in one embodiment of the invention, when the metal conductor 74 is in a free state or unassembled state, i.e., prior to assembly with the leaf springs, the metal conductor 74 does not extend at an angle of 7 degrees, but is, rather, parallel to the centerline of the brush 70 (shown as 77 in FIG. 5a). Thus, when the metal conductor 74 is at its active state, i.e., when pressed against the shaft, it extends only 8.6 degrees from its free state at the centerline 77 and it generates an insubstantial force against the shaft, so that little strain is placed on the metal conductor during the active state of operation of the ground brush 70.

As noted above, in the exciter system 10, the surface current may only be measured intermittently or as discussed above the brush may be placed in inactive state when two grounds are detected. During the inactive state of operation (shown in FIG. 5b), the metal conductor 74 is withdrawn away from the coupling 24, i.e., away from its active position at 8.6 degrees past the centerline 77. When in the inactive state, the metal spring 74 extends at an angle of 10.3 degrees in this embodiment from its centerline 77 which is also its free state position. As a consequence, the angle between the pre-bent or free state position 77 of metal conductor 74 and its inactive state position is equal to only 10.3 degrees.

As a consequence, the metal conductor 74 is: 1) under only a small level of strain when in its active state 77, 8.6 degrees past its centerline 77; and 2) extends at only 10.3 degrees past its free, pre-bent, or non-straining position 77 when in its inactive state (shown in FIG. 5b). As a consequence, the metal conductor 74 is subject to less excessive metal fatigue than the prior art metal conductors.

In another embodiment of the invention, the metal conductor is pre-bent 8.6 degrees to the position of the brush 70 when in the active state, i.e., electrically engaging the coupling 24. Thus, in this embodiment of the invention, when the metal conductor 74 is in a free state or unassembled state, i.e., prior to assembly with the leaf springs, the metal conductor 74 extends at an angle of 8.6 degrees, from the centerline of the brush 70 (shown as 77 in FIG. 5a), but in the opposite direction of the prior art, i.e., 15.6 degrees different from the pre-bend of the prior art metal conductor. Thus, when the metal conductor 74 is at its active state, i.e., when pressed against the shaft it is also in its free state, 8.6 degrees past the centerline 77 and it generates no force against the shaft, so that no strain is placed on the metal conductor of this embodiment during the active state of operation of the ground brush 70.

During the inactive state of operation (shown in FIG. 5b), the metal conductor 74 is withdrawn away from the coupling 24, i.e., away from its active/free state position of 8.6 degrees past the centerline 77. When in the inactive state, the metal spring 74 extends at an angle of 10.3 degrees in this embodiment from the centerline 77 of the brush, but its free state or pre-bent position of 8.6 degrees past the centerline 77. As a consequence, the angle between the pre-bent or free state position 77 of metal conductor 74 and its inactive state position is equal to only 1.7 degrees.

As a consequence, the metal conductor 74 of this embodiment is: 1) under no strain when in its active state 77, 8.6 degrees past its centerline 77 which is equal to its pre-bent position; and 2) extends at only 1.7 degrees past its free, pre-bent, or non-straining position 77 when in its inactive state (shown in FIG. 5b). As a consequence, the metal conductor 74 is subject to less excessive metal fatigue than the prior art metal conductors.

In addition, since the ground brush 70 of the present invention has the same positions when in the active or the inactive states of operation as the prior art ground brushes, the ground brush 70 may be used to replace existing prior art brushes without requiring any modifications to ground brush assemblies.

As noted above, the metal leaf springs 76 provide forces against the brush 72 sufficient to electrically engage the surface of the coupling 24. In order to provide this force, the metal leaf springs 76 may be pre-bent pass the active position of the ground detector brush 70 to provide sufficient force when bent back to the active position. The angle of the pre-bend is determined as a function of the number of the leaf springs and the metals or alloys chosen for the leaf springs 76. In particular, the greater the number of the leaf springs, the smaller the angle of the pre-bend of the leaf springs 76 needed to generate forces to electrically contact the surface. In addition, the greater the rigidity of the metals or alloys chosen for the leaf springs, the smaller the angle of the pre-bend of the leaf springs 76 needed to generate forces to electrically contact the surface.

Although the invention has been described in terms of an exemplary embodiment, the spirit and scope of the appended claims are unlimited by any details not expressly stated in the claims. For example, as noted above, the number of leaf springs 76 can vary depending on the application of the ground detector brush 70 and the selection of the metal or alloy for each leaf spring. In addition, the choice of metals for leaf springs 76 and metal conductor 74 may also vary, i.e., each leaf spring 76 may be comprised of a different composition of metals or alloy.

What is claimed is:

1. A ground detector brush, comprising:
    a metal conductor having two sides, wherein the metal conductor extends at an angle parallel to its centerline when no forces are applied against the metal conductor;
    a brush attached to one side of the metal conductor; and
    at least two leaf springs located on the other side of the metal conductor, wherein the length of the leaf springs are offset one to another so that the length of a leaf spring adjacent to the metal conductor is longest and the length of each subsequent leaf spring adjacent to the metal conductor is successively smaller in length.

2. A ground detector brush according to claim 1 wherein the metal conductor consists essentially of copper and the leaf spring consists essentially of steel.

3. A ground detector brush according to claim 1 wherein the metal conductor is pre-bent to extend at an angle of an active state of the ground detector brush so that when the ground detector brush is in the active state, no strain is placed on the metal conductor.

4. A ground detector brush suitable for replacing an existing ground detector brush having a metal conductor used to provide force to electrically contact a surface, comprising:
    a metal conductor having two sides wherein the metal conductor extends at an angle parallel to its centerline when no forces are applied against the metal conductor;
    a brush attached to one side of the metal conductor; and
    at least two leaf springs located on the other side of the metal conductor, wherein the length of the leaf springs are offset one to another so that the length of a leaf spring adjacent to the metal conductor is longest and the length of each subsequent leaf spring adjacent to the metal conductor is successively smaller in length.

5. A ground detector brush according to claim 4 wherein the metal conductor consists essentially of copper and the leaf spring consists essentially of steel.

6. A ground detector brush according to claim 4 wherein the length of the leaf springs are offset one to another so that the length of a leaf spring adjacent to the metal conductor is the longest and the length of each subsequent leaf spring adjacent to the metal conductor is successively smaller in length.

7. An exciter system of a turbine-generator comprising:
    an exciter;
    a coupling operatively coupled to the exciter;
    a generator rotor operatively coupled to the coupling; and
    a ground detector brush operatively coupled to the coupling, the ground detector brush including:
        a metal conductor having two sides wherein the metal conductor extends at an angle parallel to its centerline when no forces are applied against the metal conductor;
        a brush attached to one side of the metal conductor, and
        at least two leaf springs located on the other side of the metal conductor, wherein the length of the leaf springs are offset one to another so that the length of a leaf spring adjacent to the metal conductor is the longest and the length of each subsequent leaf spring adjacent the metal conductor is successively smaller in length.

8. An exciter system according to claim 7 wherein the metal conductor consists essentially of copper and the leaf spring consists essentially of steel.

9. An exciter system according to claim 7 wherein the metal conductor is pre-bent to extend at an angle of an active state of the ground detector brush so that when the ground detector brush is in the active state, no strain is placed on the metal conductor.

10. A ground detector assembly comprising:
    a first and a second ground detector brush, each ground detector brush including:
        a metal conductor having two sides wherein the metal conductors of the ground detector brushes extend at an angle parallel to their centerline when no forces are applied against the metal conductors;
        a brush attached to one side of the metal conductor; and
        at least two leaf springs located on the other side of the metal conductor, wherein the length of the leaf springs of the ground detector brush is offset one to another so that the length of the leaf spring adjacent to the metal conductor is the longest and the length of each subsequent leaf spring adjacent to the metal conductor is successively smaller in length.

11. A ground detector assembly according to claim 10 wherein the metal conductors of the ground detector brushes consist essentially of copper and the leaf springs of the ground detector brushes consist essentially of steel.

12. A ground detector assembly according to claim 10 wherein the metal conductors of the ground detector brushes are pre-bent to extend at an angle of an active state of the ground detector brushes so that when the ground detector brushes are in the active state, no strain is placed on the metal conductors.

13. A ground detector assembly according to claim 10 wherein one ground detector brush is used to supply a ground.

14. A ground detector assembly according to claim 13 wherein the other ground detector brush is used to provide an electrical path to monitor a current level of a system.

* * * * *